(12) United States Patent
Norem et al.

(10) Patent No.: US 8,894,537 B2
(45) Date of Patent: Nov. 25, 2014

(54) ANTI-ROTATION FOR THRUST WASHERS IN PLANETARY GEAR SYSTEM

(75) Inventors: Dean A. Norem, Cherry Valley, IL (US); Tye L. Klipp, Roscoe, IL (US); Jeff A. Brown, Cherry Valley, IL (US); Bradley A. Delmore, Machesney Park, IL (US); William C. Trommer, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 998 days.

(21) Appl. No.: 12/983,440

(22) Filed: Jan. 3, 2011

(65) Prior Publication Data

US 2012/0171017 A1 Jul. 5, 2012

(51) Int. Cl.
F16H 57/00 (2012.01)
F02C 7/277 (2006.01)
F16H 57/08 (2006.01)

(52) U.S. Cl.
CPC ........... *F16H 57/08* (2013.01); *F02C 7/277* (2013.01); *F05D 2250/231* (2013.01); *F05D 2260/40311* (2013.01); *F16H 2057/085* (2013.01)
USPC .......................................... 475/331; 475/348

(58) Field of Classification Search
CPC ...................................................... F16H 57/00
USPC ................................................. 475/331, 348
See application file for complete search history.

(56) References Cited

U.S. PATENT DOCUMENTS

| | | | |
|---|---|---|---|
| 3,667,324 A | 6/1972 | Laing | |
| 3,795,428 A * | 3/1974 | Paine et al. | 384/286 |
| 4,406,474 A | 9/1983 | Scharf | |
| 4,480,492 A * | 11/1984 | Fujioka et al. | 74/467 |
| 4,998,909 A * | 3/1991 | Fuehrer | 475/331 |
| 5,413,418 A | 5/1995 | Lee | |
| 5,846,001 A | 12/1998 | Muntnich et al. | |
| 5,918,987 A | 7/1999 | Sundquist et al. | |
| 5,927,870 A | 7/1999 | Kranz et al. | |
| 5,967,674 A | 10/1999 | Reubelt et al. | |
| 6,527,660 B1 | 3/2003 | Sugden | |
| 6,533,461 B2 | 3/2003 | Gottlieb | |
| 7,056,255 B2 * | 6/2006 | Hay | 475/220 |
| 7,250,688 B2 | 7/2007 | Thomson | |
| 7,708,663 B2 | 5/2010 | Himmelmann et al. | |
| 7,737,591 B2 | 6/2010 | Himmelmann et al. | |

FOREIGN PATENT DOCUMENTS

| | | |
|---|---|---|
| CN | 101147012 A | 3/2008 |
| GB | 981607 A | 1/1965 |
| GB | 1366865 A | 9/1974 |
| JP | 2001314059 A | 11/2001 |
| JP | 2007236198 A | 9/2007 |

OTHER PUBLICATIONS

Chinese Search Report for Chinese Patent Application No. 201210000635.2 completed on May 13, 2014.

* cited by examiner

*Primary Examiner* — Edwin A Young
(74) *Attorney, Agent, or Firm* — Carlson, Gaskey & Olds, PC

(57) ABSTRACT

A bushing for use in a planetary gear system has a cylindrical body portion defining a bore extending along a central axis to be received on a planetary gear shaft. A tab extends axially beyond a nominal body portion of the bushing and is received in a notch in a thrust washer adjacent to the bushing to prevent rotation of the thrust washer. A gear cage and an air turbine starter incorporating the bushing, along with a method of installing the bushing are also disclosed.

16 Claims, 4 Drawing Sheets

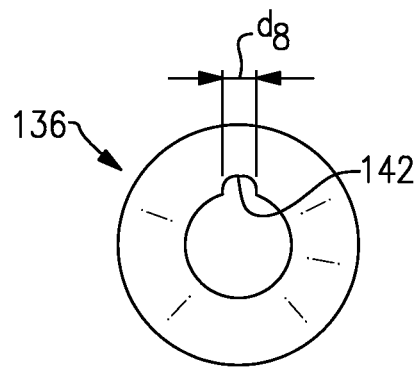 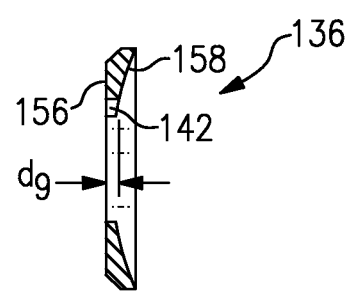
FIG.6A    FIG.6B
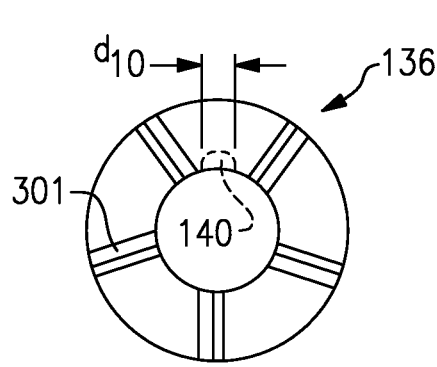 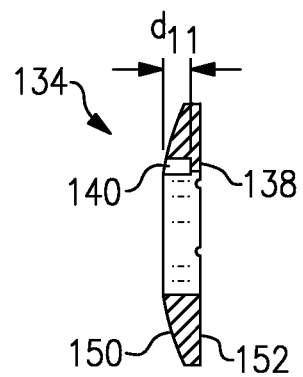
FIG.7A    FIG.7B

ANTI-ROTATION FOR THRUST WASHERS IN PLANETARY GEAR SYSTEM

BACKGROUND

This application relates to a retention feature for retaining a thrust washer against rotation in a planetary gear system.

Planetary gear systems are well known, and have been utilized to provide a gear change between an input and an output. A sun gear rotates about a central axis, and a ring gear rotates about the same center but outwardly of the sun gear. A plurality of planet gears are positioned to transmit rotation from the sun gear to the ring gear.

In one known type of planetary gear system, the planet gears are mounted on stationary shafts positioned inwardly of the ring gears. The planet shaft provides an inner race for bearings which support the planet gears. Also, thrust washers sit at both ends of the planet shaft, and provide axial thrust surfaces against the end surfaces of the planet gears.

One application of a planetary gear system is in an air turbine starter system. In an air turbine starter system, air is delivered across a turbine rotor to drive the rotor. The rotor drives a sun gear, which drives a ring gear through planet gears. The ring gear in turn drives a starter output shaft for a gas turbine engine.

In such applications, the asymmetry and clearances of the planet gears tend to induce an axial force, which reacts against the thrust washers. Those reacted gear forces attempt to rotate the thrust washers, which must remain stationary relative to the fixed housing. The thrust washers serve to provide a designated durable surface for that relative motion and loading. In the prior art, the thrust washers received a simple pin to limit rotation.

SUMMARY

A bushing for use in a planetary gear system has a cylindrical body portion defining a bore extending along a central axis to be received on a planetary gear shaft. A tab extends axially beyond a nominal body portion of the bushing and is received in a notch in a thrust washer adjacent to the bushing to prevent rotation of the thrust washer.

A gear cage and an air turbine starter incorporating the bushing, along with a method of installing the bushing are also disclosed and claimed.

These and other features of the present invention can be best understood from the following specification and drawings, the following of which is a brief description.

BRIEF DESCRIPTION OF THE DRAWINGS

FIG. 6A shows another thrust washer.
FIG. 6B is a cross-sectional view of the FIG. 6A thrust washer.
FIG. 7A shows yet another thrust washer.
FIG. 7B is a cross-sectional view of the FIG. 7A thrust washer.

DETAILED DESCRIPTION

Figure 1:
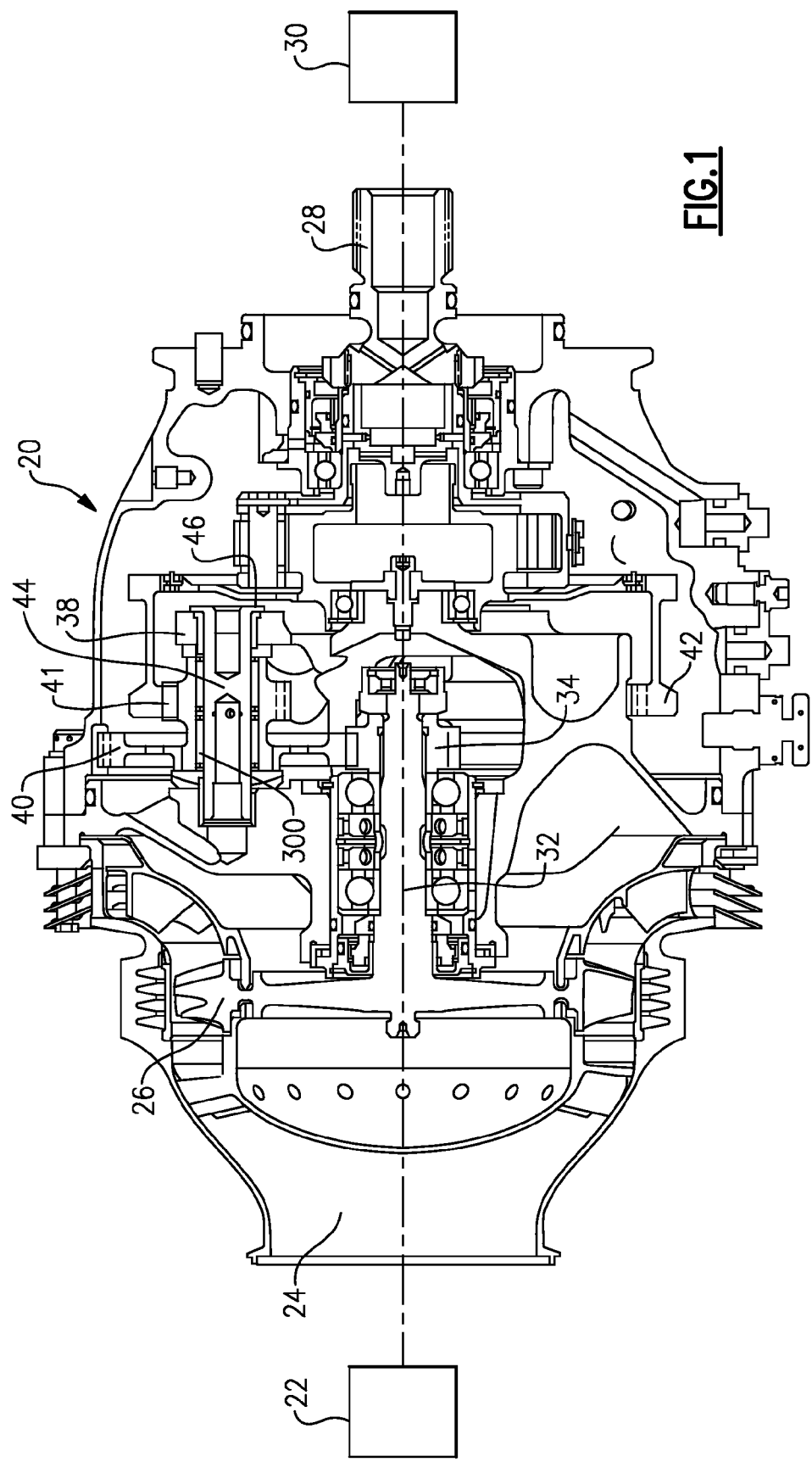
FIG. 1 shows an air turbine starter assembly.

An air turbine starter assembly 20 may be associated with an aircraft, or other systems including a gas turbine engine as shown in FIG. 1. A source of hot air 22, which may be from an auxiliary power unit, as typically utilized while on the ground, delivers hot, high pressure air into an inlet 24. The high pressure air flows across a turbine rotor 26, causing the turbine rotor 26 to rotate. As the turbine rotor 26 rotates, it rotates an output shaft 28 through a planetary gear system. The output shaft 28 may be utilized as a starter, to initiate operation of a main gas turbine engine 30.

The planetary gear system includes a sun gear 34 that is driven by a rotor shaft 32 that rotates with the turbine rotor 26. The sun gear 34 in turn drives a plurality of planet gears 40. The planet gears 40 include output gear teeth 41, which drive a ring gear 42. The ring gear 42 drives the output shaft 28 through a mechanical clutch connection.

The planet gears 40 rotate about a stationary planet shaft 44. The stationary planet shaft 44 includes an end flange 46 that is fixed to prevent rotation relative to a housing 38. Needle bearings 300 support the gear 40 on stationary shaft 44.

Figure 2:
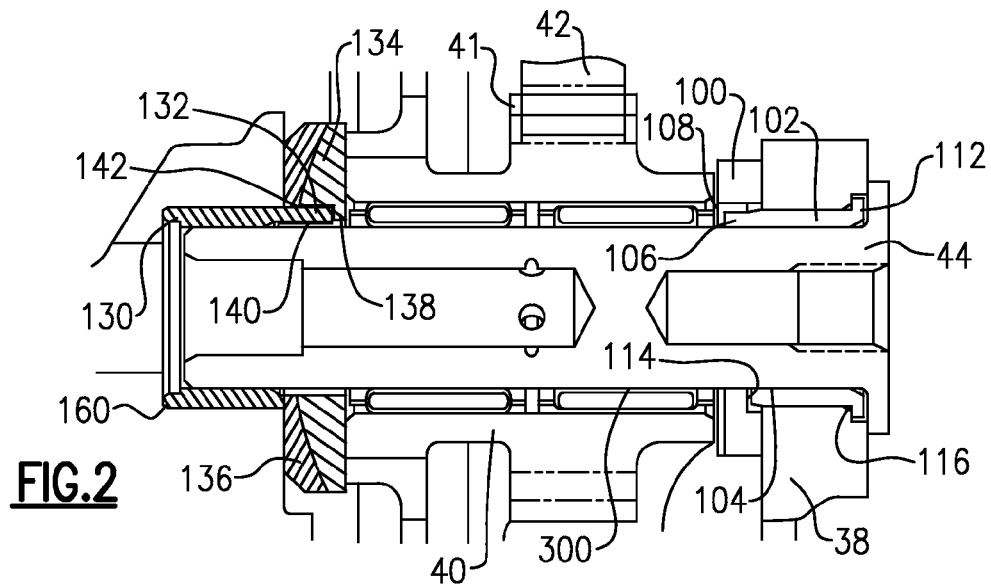
FIG. 2 shows a portion of a gear cage.

As shown in FIG. 2, a thrust washer 100 sits on one end face of the planet gear 40, and the combined pair of thrust washers 134 and 136 sit on an opposed end. A bushing 102 includes a nominal body portion press-fit into the housing bore, and has a protruding axial tab 106 at one end extending into a notch 108 in the thrust washer 100. The tab 106 prevents rotation of the thrust washer 100. A flange 112 is formed at an outboard end of the bushing 102, and serves to position the bushing against the counterbore surface 116 in the housing 38.

Figure 3A:
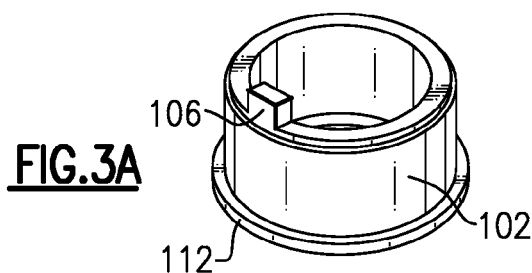
FIG. 3A shows a perspective view of a flanged bushing.

FIG. 3A shows a detail of the bushing 102, including the flange 112 and tab 106.

Figure 3B:
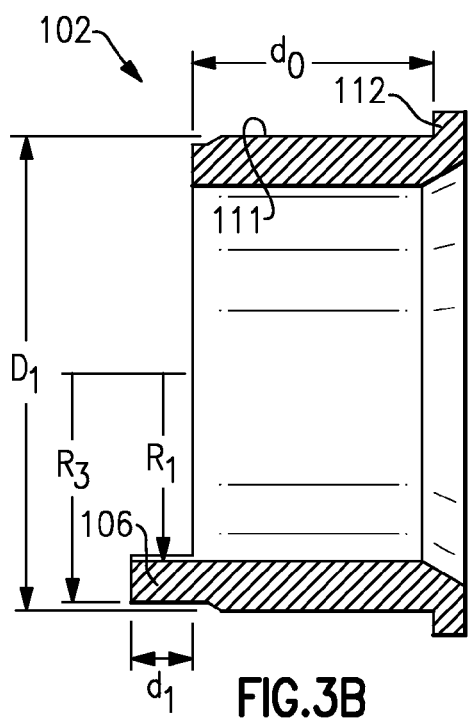
FIG. 3B is a cross-sectional view through the flanged bushing of FIG. 3A.

The bushing 102 is shown in cross-section in FIG. 3B. A nominal body portion 111 is the portion which is force-fit into a housing bore. The flange 112 is also illustrated. The tab 106 extends axially from the nominal body portion 111. As shown, the nominal body portion 111 extends for an axial length $d_0$, while the tab extends for an axial length $d_1$. The tab 106 has an inner curved surface positioned from a center axis by a radius $R_1$. The outer periphery of tab 106 is defined by R3. The outer periphery of body 111 is defined by $D_1$ which is the surface contacting the housing bore.

Figure 3C:
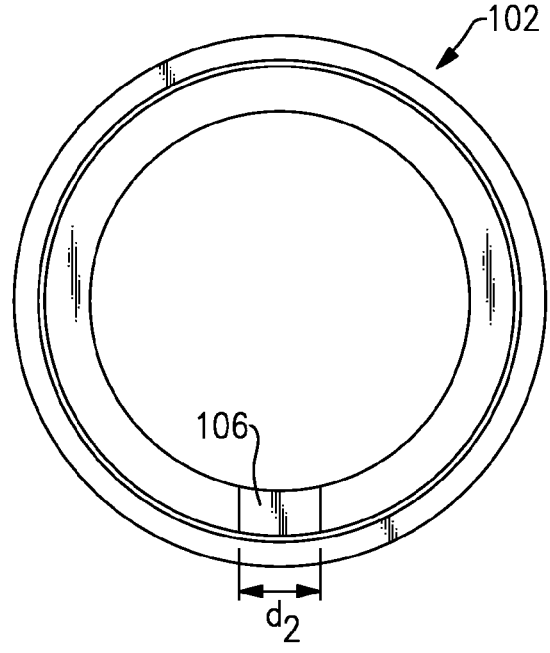
FIG. 3C is an end view of the flanged bushing of 3A.

As shown in FIG. 3C, the bushing 102 has the tab 106 extending over a circumferential width $d_2$. The $d_2$ dimension is a side-to-side dimension, generally extending circumferentially. In the embodiment shown, the sides are generally parallel to each other, and the distance would thus be measured between the parallel sides. An alternate embodiment could have those surfaces radiating from center, for which d2 would be an arc length or an angular dimension.

Figure 4A:
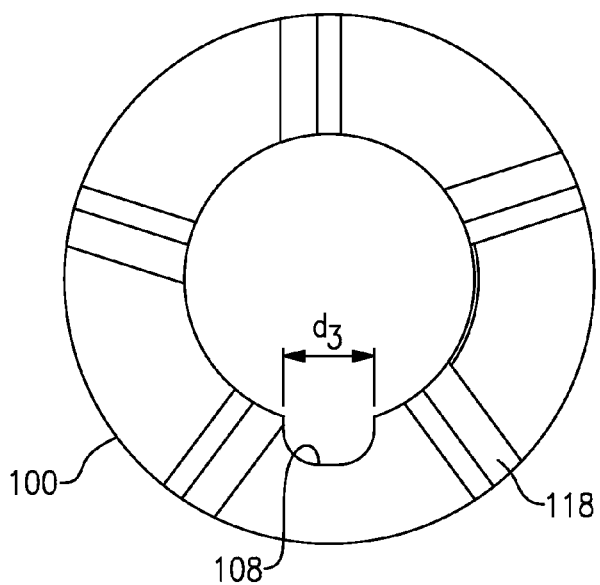
FIG. 4A shows a thrust washer.
Figure 4B:
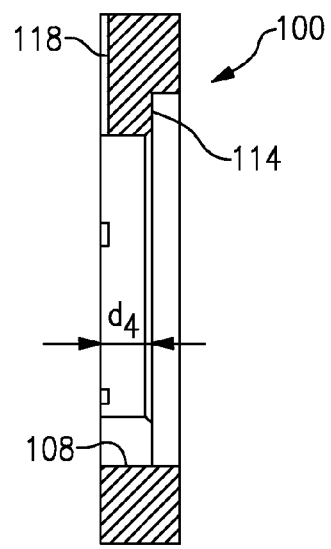
FIG. 4B is a cross-sectional view of the FIG. 4A thrust washer.

FIG. 4A shows the thrust washer 100 having oil grooves 118 on one face, and a notch 108. A countersunk bore 114 can also be seen in FIG. 4B. As shown, the notch 108 extends for a circumferential width $d_3$. As also shown in FIG. 4B, the inner most bore of the washer 100 (that length not including the countersunk bore 114) extends for an axial dimension $d_4$.

In one embodiment, $d_0$ was 0.386" (0.980 cm); $d_1$ was 0.100" (0.254 cm); $d_2$ was 0.125" (0.317 cm); $d_3$ was 0.196" (0.498 cm); and $d_4$ was 0.108" (0.274 cm). In that same embodiment, $D_1$ was 0.766" (1.94 cm), and $R_1$ was 0.303" (0.770 cm), and R3 was 0.373" (0.947 cm).

In embodiments, a ratio of $d_1$ to $d_0$ is between 0.2 and 1.0; a ratio of $d_2$ to $d_3$ is between 0.60 and 0.98; and a ratio of $d_1$ to $d_4$ is between 0.20 and 0.98.

Returning to FIG. 2, at an opposed end of the planet gear 40, is a flangeless bushing 130, which is also press-fit into the gear cage housing bore, and positioned by bottoming on the bushing end face 160. Bushing 130 also has a tab or an extension 132 extending inboard, which engages into the notch 142 in thrust washer 136 and into notch 140 in thrust washer 134. Thrust washers 134 and 136 function together as a spherical joint, in which thrust washer 134 nests into thrust washer 136. Thrust washer 136 has a notch 142 extending through its entire axial length, while thrust washer 134 has notch 140 extending a finite axial distance. The tab 132 of the bushing 130 extends within the notches 140 and 142 in the washers 134 and 136 to prevent rotation of those washers.

Figure 5A:
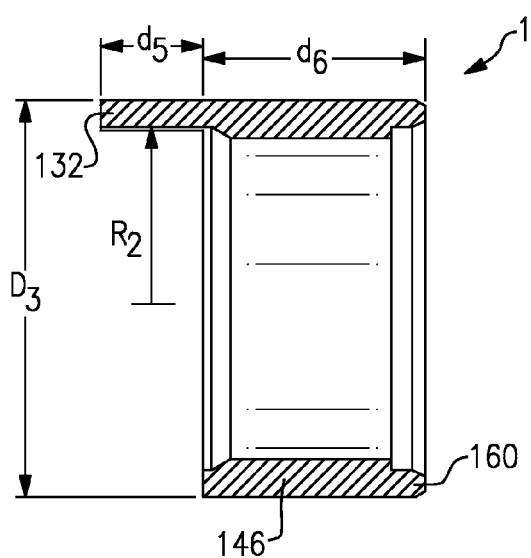
FIG. 5A is a cross-sectional view through a second bushing.

FIG. 5A shows the bushing 130. Tab 132 extends from the nominal body portion 146. As shown, the outer periphery of the nominal body portion 146 is at a diameter $D_3$. The inner curved surface of the tab 132 is at a radius $R_2$. The tab 132 extends for an axial distance of $d_5$, while the nominal body portion 146 extends for an axial dimension of $d_6$.

Figure 5B:
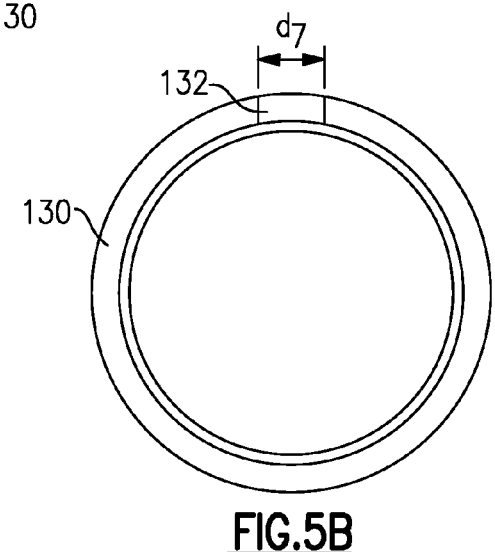
FIG. 5B is an end view of the sleeve.

FIG. 5B is an end view of the bushing 130, and shows the tab 132. Tab 132 extends for a side-to-side dimension $d_7$, measured circumferentially. In the embodiment shown, the sides are generally parallel to each other, and the distance would thus be measured between the parallel sides. An alternate embodiment could have those surfaces radiating from center, for which d2 would be an arc length or an angular dimension.

The washer 136 is illustrated in FIG. 6A. As can be seen between FIGS. 6A and 6B, a concave face 158 is formed on one side, and spaced from a perpendicular face 156. A notch 142 extends through the entire axial thickness of the washer 136. As shown in FIG. 6A, the width of the notch 142 is defined as $d_8$.

FIG. 6B shows the washer 136 has the notch 142 extending for an axial length $d_9$.

FIG. 7A shows the washer 134. Washer 134 has a notch 140 with a width $d_{10}$. Also, oil grooves 301 can be seen.

FIG. 7B shows the mating thrust washer 134. Washers 134 and 136 nest together, as mentioned above. Washer 134 has a notch 140 extending to an end surface 138, with a depth $d_{11}$. A convex face 150 is spaced from a relatively perpendicular face 152.

In one embodiment, $d_5$ was 0.191" (0.485 cm); $d_6$ was 0.413" (1.04 cm); $d_7$ was 0.125" (0.317 cm); $d_8$ was 0.196" (0.498 cm); $d_9$ was 0.070" (0.178 cm); $d_{10}$ was 0.196" (0.498 cm); and $d_{11}$ was 0.140" (0.356 cm). In that same embodiment, $D_3$ was 0.746" (1.90 cm) and $R_2$ was 0.323" (0.820 cm). In embodiments, a ratio of $d_5$ to $d_6$ is between 0.20 and 1.0; a ratio of $d_7$ to $d_8$ is between 0.60 and 0.98; and a ratio of $d_5$ to the sum of $d_9$ and $d_{11}$ was between 0.2 and 0.98.

Both distances $d_2$ and $d_7$ could be defined as side-to-side distances measured circumferentially about an axis. Of course, the sides are generally parallel to each other, and the distance would thus be measured between the parallel sides. An alternate embodiment could have those surfaces radiating from center, for which d2 would be an arc length or an angular dimension.

The tabs and grooves are sized such that there is a small clearance between the outer periphery of the tab and the inner periphery of the groove. Still, the tabs will prevent relative rotation of the grooves, and their respective component features.

This assembly provides a secure way of preventing rotation of the washers 134, 136 and 100, without requiring extra components.

This method of assembly and rotation restriction provides increased contact area between the tab sides and slot edges, thereby reducing the unit load per area. This notably reduces the contact stresses, and improves wear life of the mating parts.

The disclosed combinations will increase the life of the assembly by increasing a contact area, thereby reducing stress and wear. The assembly of the embodiments is improved by reducing part count, thereby reducing inventory and related costs. In addition, there are reduced assembly operations and labor, and an ease of assembly benefits. As an example, the disclosed combinations eliminate blind assembly, such as inserting narrow pins into a blind hole.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gear cage comprising:
   a planet gear to be incorporated into a planetary gear system for rotation about an axis;
   at least one bearing for supporting said planet gear;
   a pair of bushings mounted at opposed axial ends of said gear, each of said bushings being associated with a thrust washer, each of said thrust washers including a notch, and each of said bushings including a tab extending axially from a nominal body of said bushing, and received in said notch of said associated thrust washer to prevent rotation.

2. The gear cage as set forth in claim 1, wherein a ratio of an axial length of said tabs to an axial length of said nominal body portions being between 0.20 and 1.0.

3. The gear cage as set forth in claim 1, wherein a ratio of a circumferential width of said tabs, to a circumferential width of the notches which receive the tabs is between 0.60 and 0.98.

4. The gear cage as set forth in claim 1, wherein a ratio of an axial length of each said tab to an axial length of the notch in the associated thrust washer is between 0.20 and 0.98.

5. The gear cage as set forth in claim 1, wherein a ratio of an axial length of said tab to an axial length of said nominal body portion being between 0.20 and 1.0, a ratio of a circumferential width of said tab, to a circumferential width of the notches which receive the tabs is between 0.60 and 0.98, and a ratio of the axial length of each tab to an axial length of the notch in the associated thrust washer is between 0.20 and 0.98.

6. The gear cage as set forth in claim 1, wherein the thrust washer associated with one end of said gear includes a pair of thrust washers, with one of said pair of thrust washers being formed with a perpendicular face, and a convex face, and the other of said pair of thrust washers being formed with a perpendicular face and a concave face, and said pair of thrust washers nested within each other, with one of said pair of thrust washers having a notch portion extending through an entire axial thickness, and the other of said pair of thrust washers having a notch portion which does not extend through an entire axial thickness, with said notch portions together defining said notch.

7. An air turbine starter comprising:
   an air inlet for directing air across a turbine rotor, said turbine rotor being driven to rotate by the air, and drive a turbine shaft, said turbine shaft driving a planetary gear system by driving a sun gear;

a plurality of planet gears to be driven by said sun gear about an axis;

said plurality of planet gears engaged to drive a ring gear;

a housing for supporting said planet gears;

said planet gears including a bearing within an inner peripheral bore, and a planet shaft in each said planet gear supported within said bearing; and a pair of bushings mounted at opposed axial ends of each said gear, each of said bushings being adjacent a thrust washer, each of said thrust washers including a notch, and each of said bushings including a tab extending axially from a nominal body of said bushing, and received in said notch of said associated thrust washer to prevent rotation.

8. The air turbine starter as set forth in claim 7, wherein a ratio of an axial length of said tabs to an axial length of said nominal body portions being between 0.20 and 1.0.

9. The air turbine starter as set forth in claim 7, wherein a ratio of a circumferential width of said tabs, to a circumferential width of the notches which receive the tabs is between 0.60 and 0.98.

10. The air turbine starter as set forth in claim 7, wherein a ratio of an axial length of each said tab to an axial length of the notch in the associated thrust washer is between 0.20 and 0.98.

11. The air turbine starter as set forth in claim 7, wherein a ratio of an axial length of said tab to an axial length of said nominal body portion being between 0.20 and 1.0, a ratio of a circumferential width of said tab, to a circumferential width of the notches which receive the tabs is between 0.60 and 0.98, and a ratio of the axial length of each said tab to an axial length of the notch is between 0.20 and 0.98.

12. The air turbine starter as set forth in claim 7, wherein the thrust washer associated with one end of said gear includes a pair of thrust washers, with one of said pair of thrust washers being formed with a perpendicular face, and a convex face, and the other of said pair of thrust washers being formed with a perpendicular face and a concave face, and said pair of thrust washers nested within each other, with one of said pair of thrust washers having a notch portion extending through an entire axial thickness, and the other of said pair of thrust washers having a notch portion which does not extend through an entire axial thickness, with said notch portions together defining said notch.

13. The air turbine starter as set forth in claim 12, wherein a ratio of an axial length of said tabs to an axial length of said nominal body portions being between 0.20 and 1.0.

14. The air turbine starter as set forth in claim 12, wherein a ratio of a circumferential width of said tabs, to a circumferential width of the notches which receive the tabs is between 0.60 and 0.98.

15. The air turbine starter as set forth in claim 12, wherein a ratio of an axial length of each said tab to an axial length of the notches in the associated thrust washer is between 0.20 and 0.98.

16. A method of assembling a gear cage into an air turbine starter comprising the steps of:

placing a pair of axial spaced bushings about a planet gear shaft, and placing a planet gear between said bushings, thrust washers positioned to have faces abutting said gear, and inserting tabs extending axially beyond nominal body portions of said bushings into notches in the thrust washers to prevent rotation of the thrust washers.

* * * * *